Patented Aug. 29, 1950

2,520,516

UNITED STATES PATENT OFFICE 2,520,516

CYCLIC AMINES AND METHOD OF MAKING THEM

Gerritt John Van Zoeren, Holland, Mich., assignor to The Wm. S. Merrell Company, Cincinnati, Ohio, a corporation of Delaware No Drawing. Application January 19, 1945, Serial No. 573,633

5 Claims. (Cl. 260—329)

This invention relates to a novel group of organic chemical compounds having valuable pharmaceutical properties, and to pharmaceutical compositions in which such compounds are used as medicinal agents.

This application is a continuation in part of my copending application, Serial No. 390,778, filed April 28, 1941, now Patent No. 2,367,702.

Prior to my invention it has been generally known that many aralkyl amines possess vasoconstrictor and other useful properties; and, as set forth in said patent, thienyl-alkyl amines are similarly valuable.

The present invention is directed to certain novel dicyclic compounds having valuable physiological and more particularly sympathomimetic properties. These consist of dicyclic amines wherein the ring carrying the amino nitrogen is saturated and wherein the other ring is either a benzene or a thiophene nucleus.

Although I am given below certain specific examples of my invention and its application in practical use and am giving also certain modifications and alternatives, it should be understood that these are not intended to be exhaustive or limiting of the invention. On the contrary, I am giving these as illustrations and am giving herewith explanations in order fully to acquaint others skilled in the art with my invention and the principles thereof and a suitable manner of its application in practical use, so that others skilled in the art may be enabled to modify the invention and to adapt it and apply it in numerous forms each as may be best suited to the requirement of a particular use.

EXAMPLE 1

2-thienyl-1-amino-cyclopentane.

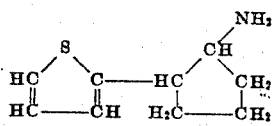

This compound may be prepared for example, by a reaction carried out in two steps:

Step 1

Thienyl magnesium halide is made to react with 2-halogeno cyclopentanone-1 to give 2-thienyl cyclopentanone-1.

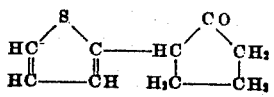

In one procedure, the Grignard reaction is carried out in a dry, four-necked flask. One neck carries an efficient condenser cooled with running ice-cold water and protected against ingress of moist air and carbon dioxide by a soda-lime tube. A second neck carries a thermometer reaching below the reaction level. A third neck carries a dropping funnel. A fourth and central opening of the flask carries a sealed agitator.

The flask is charged with 9.5 g. Grignard grade magnesium turnings, a crystal of iodine, about 30 cc. dry ether and 5 g. of 2-bromothiophene. After assembling it, the flask is immersed for a short time in warm water to start the reaction. When the initial reaction has subsided, agitation is commenced, about 50 cc. more dry ether is added and a solution of 60 g. of 2-bromothiophene in about 50 cc. dry ether is dropped in at such a rate that brisk boiling of the ether is maintained without external warming. After all the bromo-thiophene solution has been added, the flask is again immersed in hot water and refluxing continued for an extra half hour or until nearly all of the magnesium has reacted. The flask is now immersed in an ice and salt bath and cooled with good agitation. When the temperature of the Grignard solution has reached about —5° C., a solution of 41 g. of freshly fractionated 2-chlorocyclopentanone-1 is added dropwise while maintaining the temperature below —5° C. Subsequently the reaction is allowed to proceed at about 0° C. for an additional one hour. The ice bath is then taken away and the reaction mixture is allowed to warm up gradually to room temperature and is then heated to boiling, when a rather violent reaction sets in and has to be regulated by occasional cooling. As soon as the reaction subsides, the flask is immersed in a hot water bath and the ether solution refluxed for a number of hours to finish the isomerization reaction. (The isomerization can be expedited, if desired, by distilling off some of the ether with consequent rise of temperature.)

The flask is cooled in ice water and the reaction product is treated with crushed ice, then with cold dilute acid (such as acetic or hydrochloric). By careful, slow stirring the solids gradually disappear. The layers are now allowed to stratify. The lower, aqueous layer is drawn off and shaken once with a little ether. The combined ether solution is shaken once with a small amount of cold dilute acid, then with water, then with a sodium carbonate solution to neutrality. It is finally washed twice with small amounts of cold water and subjected to fractionation. After the ether is driven off under atmospheric pressure, vacuum is applied and the thienyl cyclopentanone is obtained.

Other halogenated thiophenes such as a methyl bromothiophene may be used to prepare the corresponding Grignard compounds for use in preparation of the ketones for the present invention.

*Step 2.—Amination*

Commercial ammonium carbonate, 57 gm., is charged into a 250 cc. three-necked flask, which carries a wide diameter air tube connected to a cooled condenser, a thermometer and a dropping funnel. Concentrated formic acid (58 gm.) is slowly dropped in and then the temperature is raised slowly until the inside temperature reaches 170° C.

43 gm. of thienyl cyclopentanone obtained in Step 1 is now dropped into the ammonium formate and the reaction mixture maintained at about 170° 3-4 hours. After cooling, the reaction mixture is treated with about 100 cc. water, shaken and the oil layer separated. The oil is refluxed with about 45 cc. concentrated hydrochloric acid about 1 hour, then diluted with about 100 cc. water and shaken with benzene to extract the non-basic impurities.

The aqueous acid solution, containing the desired amine, is made strongly alkaline by adding concentrated caustic soda while cooling. Benzene is added to facilitate the separation of the amine. The benzene solution of the amine is washed twice with small amounts of water, then fractionated. After distilling off most of the benzene under atmospheric pressure, vacuum is applied and the amine is isolated. The resulting amine compounds possess valuable vasoconstrictor properties.

Other aralkyl amines may be similarly formed by use of the corresponding ketone; and secondary and tertiary amines may be similarly formed by use of alkylamine or dialkylamine salts instead of the ammonium carbonate.

EXAMPLE 2

2-thienyl-2-hydroxy-1-amino cyclopentane.

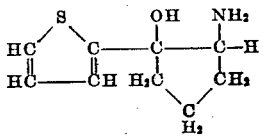

2-bromothiophene is reacted with magnesium in dry ether and the resulting Grignard reagent is treated in the cold (as in Step 1 of Example 1) with monochlorocyclopentanone.

In contrast with Example 1, however, the ethereal reaction mixture is not allowed to warm and reflux; but is decomposed directly while keeping cold, with crushed ice and dilute acid, as is the case in normal Grignard reactions. The ethereal solution containing 2-thienyl-2-hydroxy-1-chlorocyclopentane:

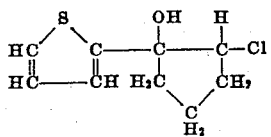

is used directly, or freed from the ether, for amination. The amination is accomplished by heating the thienyl-hydroxy chloro-cyclopentane with a solution of ammonia, conveniently in methanol.

The amine is isolated in usual manner either as a salt, e. g., the hydrochloride or sulfate, or the free amine may also be separated by distillation under high vacuum.

The chlorine atom may be substituted by amino or aralkyl amino groups by treatment with ammonia or with suitable alkyl amines.

The resulting amine compounds exhibit physiological activities which compare favorably in physiological action with various phenethylamine derivatives known and used prior to my invention.

The phenyl compounds, for example 2-phenyl-1-amino cyclopentane,

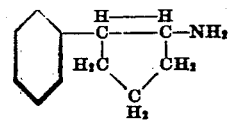

and 2-phenyl 2-hydroxy 1-amino cyclopentane.

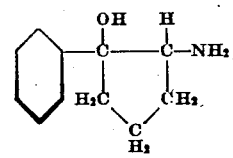

may be similarly prepared and likewise have important pharmaceutical properties. The 2-phenyl, 1-amino cyclopentane has a boiling point of 269° C. at 1 atmosphere, 121° C. at 4 mm. absolute and 95° C. at 1 mm. absolute. The hydrochloride salt of this compound melts at 189° C. to 192° C.

Cyclohexyl, cyclobutyl and cyclopropyl compounds analogous to the cyclopentyl compounds described above can be used in the same manner according to this invention. The amino group should in general be on a carbon atom adjacent to the carbon atom which is connected to the benzene or thiophene ring.

Desirably the foregoing or other thienyl or phenyl compounds may be mixed with any of a number of suitable pharmaceutical vehicles to form a pharmaceutical composition which can be effectively used and administered. Examples of such vehicles are aqueous solutions, mineral oils, glycerine jellies, sugars, starches, etc.

Instead of the simple thienyl or phenyl groups, the benzene or thiophene nucleus may carry substituents such as the hydroxyl and methyl groups.

The optical isomers as well as the racemic mixtures of the above compounds are valuable for therapeutic and physiological purposes.

Various dicyclic amines of the type wherein the ring carrying the amino nitrogen has a saturated nucleus and the other ring has a nucleus of the class consisting of the benzene nucleus and the thiophene nucleus, whether produced in the foregoing or other manner, are included within the invention in its broader aspects.

The invention also contemplates the provision and use of salts of various of the dicyclic compounds within the scope of the invention, e. g., the hydrochlorides thereof as well as various further substituted compounds (including compounds in which the amino group is alkylated) and the salts thereof; and the terms "a(n) ... amino ... compound" and the like used in the appended claims are intended, unless otherwise limited by the context, to include such compounds.

I claim:

1. A composition having useful sympathomimetic properties, said composition containing as its essential active ingredient a dicyclic amino compound haping a saturated cycloalkane ring wherein one carbon atom carries the amino nitrogen and an adjacent carbon atom of the cycloalkane ring is attached to another ring, said other ring being a member of the class consisting of the unsubstituted benzene nucleus and the unsubstituted thiophene nucleus.

2. A composition having useful sympathomimetic properties, said composition containing as its essential active ingredient an alpha-amino beta-substituted cyclopentane wherein the beta substituent is a cyclic radical which is a member of the class consisting of the unsubstituted benzene nucleus and the unsubstituted thiophene nucleus.

3. A composition having useful sympathomimetic properties and containing as its essential active ingredient 2-phenyl, 1-amino cyclopentane.

4. A composition having useful sympathomimetic properties and containing as its essential active ingredients 2-thienyl-1-amino cyclopentane.

5. A composition having useful sympathomimetic properties and containing as its essential active ingredient 2-thienyl-2-hydroxy, 1-amino cyclopentane.

GERRITT JOHN VAN ZOEREN.

REFERENCES CITED

The following references are of record in the file of this patent:

UNITED STATES PATENTS

| Number | Name | Date |
|---|---|---|
| 2,276,587 | Mettler et al. | Mar. 17, 1942 |
| 2,367,702 | Van Zoeren | Jan. 23, 1945 |

OTHER REFERENCES

Thomas: "Surquelques derives du thiophene," Comptes Rendus, Vol. 146, pp. 642–645 (1908).

Degering: "An Outline of Org. Chem." (Barnes and Noble), page 170.